US012386381B2

(12) United States Patent
Nebiki et al.

(10) Patent No.: US 12,386,381 B2
(45) Date of Patent: Aug. 12, 2025

(54) LEVER SWITCH, DISPLAY DEVICE, AND IN-VEHICLE DEVICE

(71) Applicant: DENSO TEN Limited, Kobe (JP)

(72) Inventors: Keiji Nebiki, Kobe (JP); Takahiro Tsukada, Kobe (JP)

(73) Assignee: DENSO TEN Limited, Kobe (JP)

( * ) Notice: Subject to any disclaimer, the term of this patent is extended or adjusted under 35 U.S.C. 154(b) by 0 days.

(21) Appl. No.: 18/613,228

(22) Filed: Mar. 22, 2024

(65) Prior Publication Data

US 2025/0076917 A1    Mar. 6, 2025

(30) Foreign Application Priority Data

Aug. 30, 2023   (JP) ................... 2023-140329

(51) Int. Cl.
| | |
|---|---|
| *G06F 3/02* | (2006.01) |
| *B60K 35/22* | (2024.01) |
| *G05G 9/00* | (2006.01) |
| *H01H 13/14* | (2006.01) |
| *H01H 21/22* | (2006.01) |

(52) U.S. Cl.
CPC ............. *G05G 9/00* (2013.01); *B60K 35/22* (2024.01); *G06F 3/02* (2013.01); *B60K 2360/133* (2024.01); *H01H 13/14* (2013.01); *H01H 21/22* (2013.01)

(58) Field of Classification Search
CPC .................................................. B60K 35/00
See application file for complete search history.

(56) References Cited

U.S. PATENT DOCUMENTS

| | | | | |
|---|---|---|---|---|
| 2002/0001067 A1* | 1/2002 | Tachibana | ............... | G03B 21/10 353/101 |
| 2002/0151282 A1* | 10/2002 | Wang | .................... | G06F 3/0205 455/575.1 |
| 2005/0162376 A1* | 7/2005 | Sunoue | ............... | B60R 11/0235 345/104 |

FOREIGN PATENT DOCUMENTS

JP          H07-014475 A       1/1995

* cited by examiner

*Primary Examiner* — Nan-Ying Yang
(74) *Attorney, Agent, or Firm* — Oliff PLC

(57) ABSTRACT

A lever switch includes: an operation lever including an operation portion to which an operation load is to be applied, and configured to swing around a rotation axis; a first drive lever driven by the operation lever and configured to swing around a first fulcrum to drive a first switch in response to the operation lever being operated around the rotation axis in a first direction; and a second drive lever driven by the operation lever and configured to swing around a second fulcrum to drive a second switch in response to the operation lever being operated in a second direction opposite to the first direction. When projected onto a plane orthogonal to the rotation axis, the first and second fulcrum are disposed on the same side with respect to a virtual straight line passing through the operation portion and the rotation axis, and separated from the virtual straight line.

14 Claims, 8 Drawing Sheets

LEVER SWITCH, DISPLAY DEVICE, AND IN-VEHICLE DEVICE

CROSS-REFERENCE TO RELATED APPLICATIONS

This application is based on and claims priority under 35 USC 119 from Japanese Patent Application No. 2023-140329 filed on Aug. 30, 2023, the entire content of which is incorporated herein by reference.

TECHNICAL FIELD

The present disclosure relates to a lever switch, a display device including a lever switch, and an in-vehicle device.

BACKGROUND ART

In the related art, there has been known a multi-directional lever switch that includes a plurality of switches each of which is selectively driven depending on an operation direction of the lever. Regarding this matter, JPH07-14475A has disclosed a lever switch that uses a pusher to drive switches disposed on the left and right sides of an inverted T-shaped lever by pushing an operation portion provided at a tip end of the lever to the left and right. In this type of lever switch, the switches are disposed symmetrically the left and right with respect to the fulcrum of the lever, so that lever ratios from the operation portion at the tip end of the lever to the left and right switches are equal, and the same operation feeling (operation force) may be obtained when the operation portion is pushed to either left or right.

SUMMARY

In recent years, a so-called narrow frame design in which a width of an outer frame (bezel) of a display device is narrowed has become mainstream. In a case where a multi-directional lever switch is disposed in the bezel having such a narrow frame, according to the structure of the related art described above, it is necessary to dispose the switch at a position on an opposite side across the fulcrum of the lever. Therefore, there is a problem that a mounting space is not ensured.

Aspects of the present disclosure relate to achieving space saving for a lever switch disposed in a bezel of a display device.

According to an aspect of the present disclosure, there is provided a lever switch including:
 an operation lever including an operation portion to which an operation load is to be applied, and configured to swing around a rotation axis;
 a first drive lever driven by the operation lever and configured to swing around a first fulcrum to drive a first switch in response to the operation lever being operated around the rotation axis in a first direction; and
 a second drive lever driven by the operation lever and configured to swing around a second fulcrum to drive a second switch in response to the operation lever being operated in a second direction opposite to the first direction,
 wherein when projected onto a plane orthogonal to the rotation axis, the first fulcrum and the second fulcrum are disposed on the same side with respect to a virtual straight line passing through the operation portion and the rotation axis, and are separated from the virtual straight line.

According to an aspect of the present disclosure, space saving of the lever switch may be achieved.

BRIEF DESCRIPTION OF DRAWINGS

Exemplary embodiment(s) of the present invention will be described in detail based on the following figures, wherein.

DESCRIPTION OF EMBODIMENTS

Hereinafter, as an example of an embodiment of the present disclosure, an aspect in which the present disclosure is applied to a display device provided in an in-vehicle device will be described with reference to the drawings. The embodiment described below is an example for implementing the present invention, and the present disclosure is not limited to the aspects described below. The present disclosure may also be applied to a display device provided in a mobile terminal such as a smartphone or a tablet, for example.

(Overall Configuration)

Figure 1:
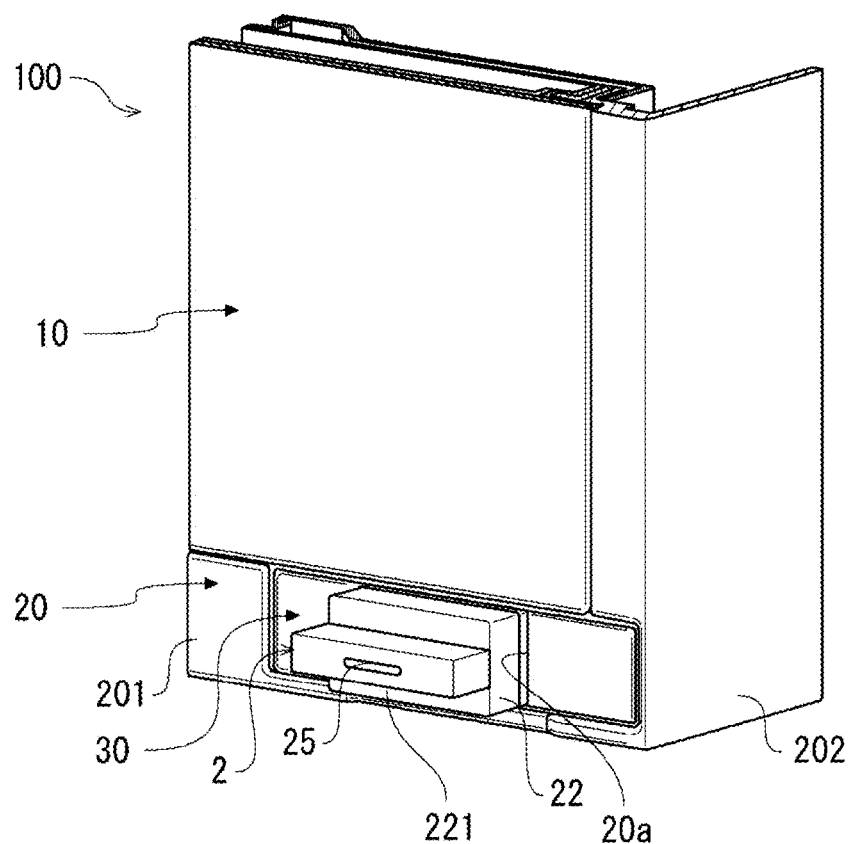
FIG. 1 is a perspective view showing a part of a display device according to an embodiment.
Figure 1:
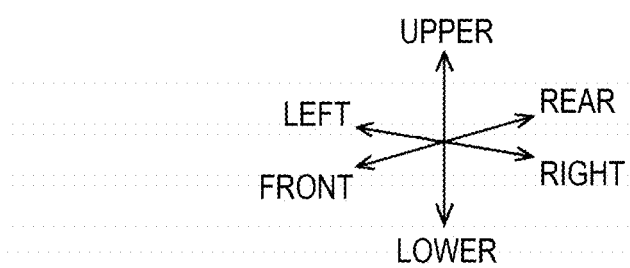
Figure 2:
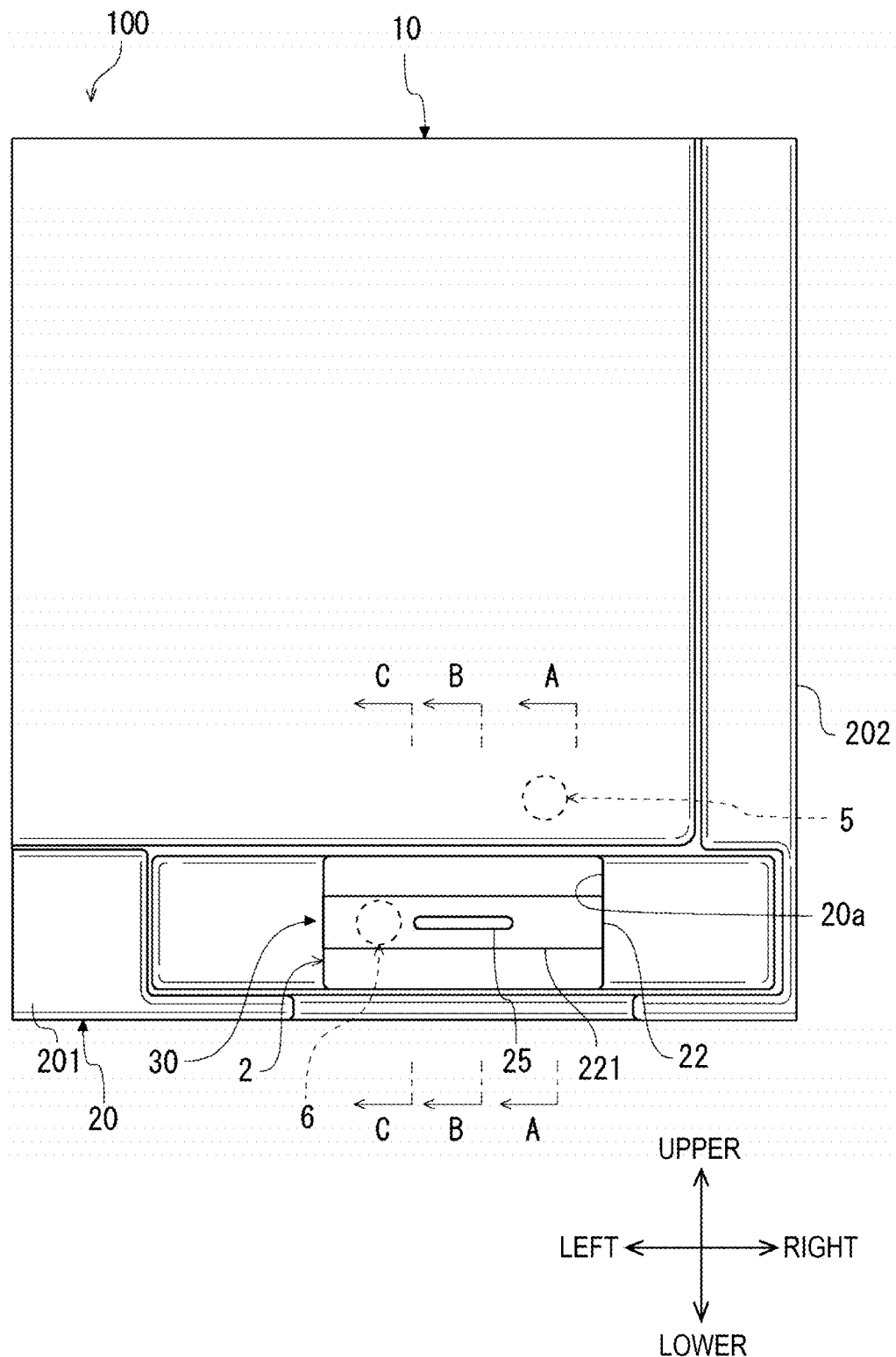
FIG. 2 is a front view showing the part of the display device according to the embodiment.

FIG. 1 is a perspective view showing a part of a display device 100 according to the present embodiment. FIG. 2 is a front view showing the part of the display device 100. FIGS. 1 and 2 show a lower right portion of the display device 100. FIGS. 1 and 2 show a state in which a lever switch to be described later is in an initial posture. In the present description, unless otherwise specified, "front-rear direction", "upper-lower direction", and "left-right direction" shown in FIG. 1 and the like are referred to as "front-rear direction", "upper-lower direction", and "left-right direction" of the display device 100. These directions merely indicate a relative positional relationship among components of the present embodiment.

The display device 100 according to the embodiment is mounted on an in-vehicle device. The in-vehicle device including the display device 100 is, for example, a car navigation device mounted on a vehicle, and provides a general car navigation function. Specifically, the in-vehicle device is embedded in an instrument panel or a dashboard (both not shown) of the vehicle. The in-vehicle device receives an operation of a user (mainly a driver), searches for a route from a current location of the vehicle to a destination, and guides a route selected by the user. The in-vehicle device includes, for example, a control device. The control device is a device that executes processing of the car navigation function in the in-vehicle device, and includes various types of hardware (not shown) such as a central processing unit (CPU), a memory, a communication interface, and an input and output interface.

The display device 100 is a device that executes input and output of various kinds of information in the in-vehicle device. As shown in FIGS. 1 and 2, the display device 100 includes a display panel 10, a bezel 20, and a lever switch 30.

(Display Panel)

The display panel 10 is a substantially rectangular panel that displays various visual information supplied from the control device. The display panel 10 is disposed to be orthogonal to the front-rear direction with a pair of opposite sides coinciding with the upper-lower direction. The display panel 10 is, for example, a liquid crystal panel. The display panel 10 may be configured such that a touch panel capable of receiving an operation by a user is superimposed on a front surface or a rear surface of the liquid crystal panel.

(Bezel)

The bezel 20 is a frame-shaped frame body assembled to surround the display panel 10. The bezel 20 includes a frame-shaped front panel 201 that is orthogonal to the front-rear direction and surrounds a peripheral edge of the display panel 10, and a tubular peripheral wall panel 202 that extends rearward from a peripheral edge of the front panel. A substantially rectangular opening 20a in which the lever switch 30 is disposed is formed in a lower frame portion of the front panel 201.

(Lever Switch)

The lever switch 30 receives an input operation by the user and outputs a signal corresponding to the input operation to the control device. The lever switch 30 is disposed at a lower frame portion of the bezel 20. The lever switch 30 includes a plurality of switches, and is configured as a multi-directional lever switch capable of selectively driving the switches according to an operation direction of an operation lever.

Figure 3:
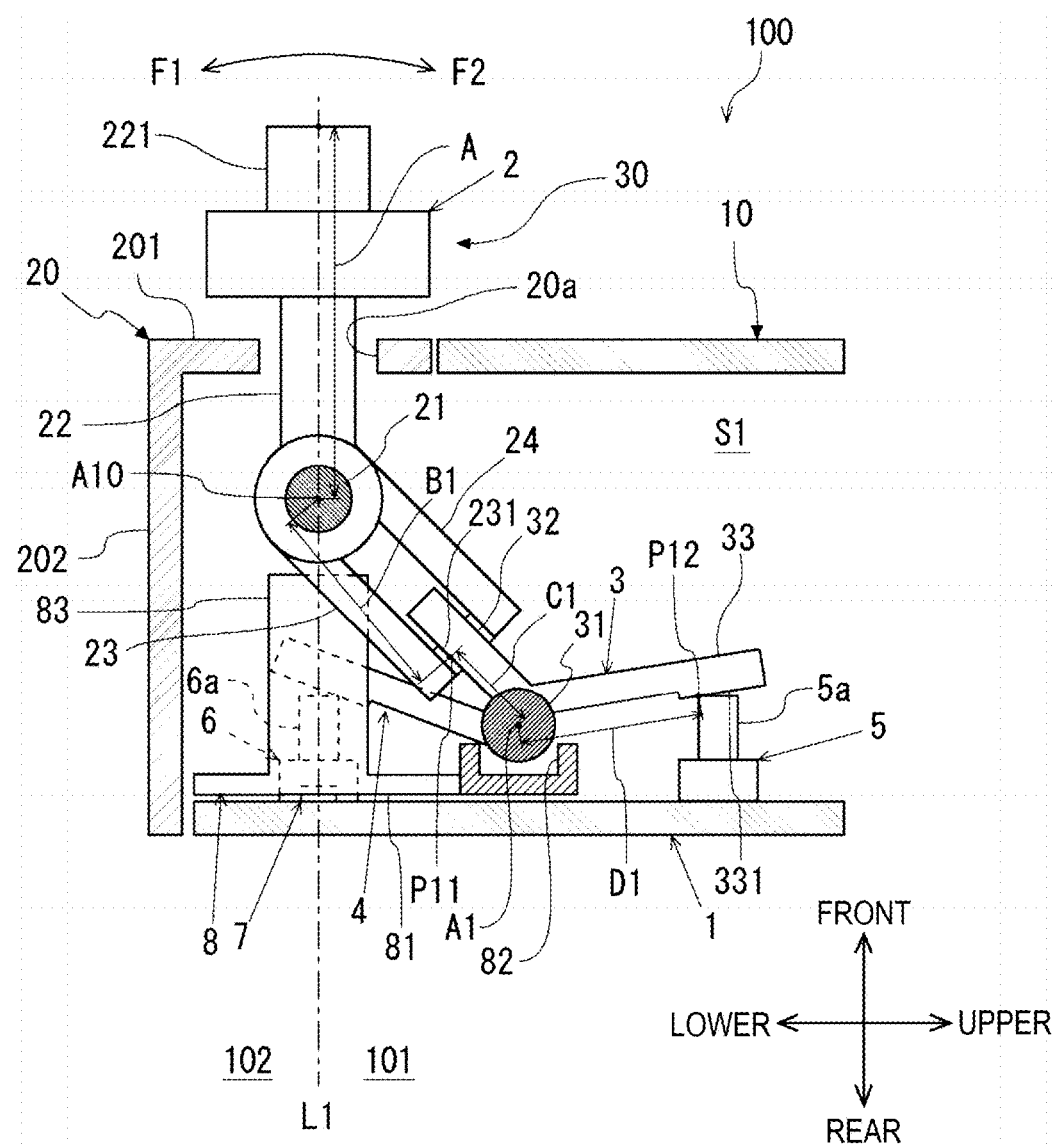
FIG. 3 is a cross-sectional view taken along a line A-A in FIG. 2.
Figure 4:
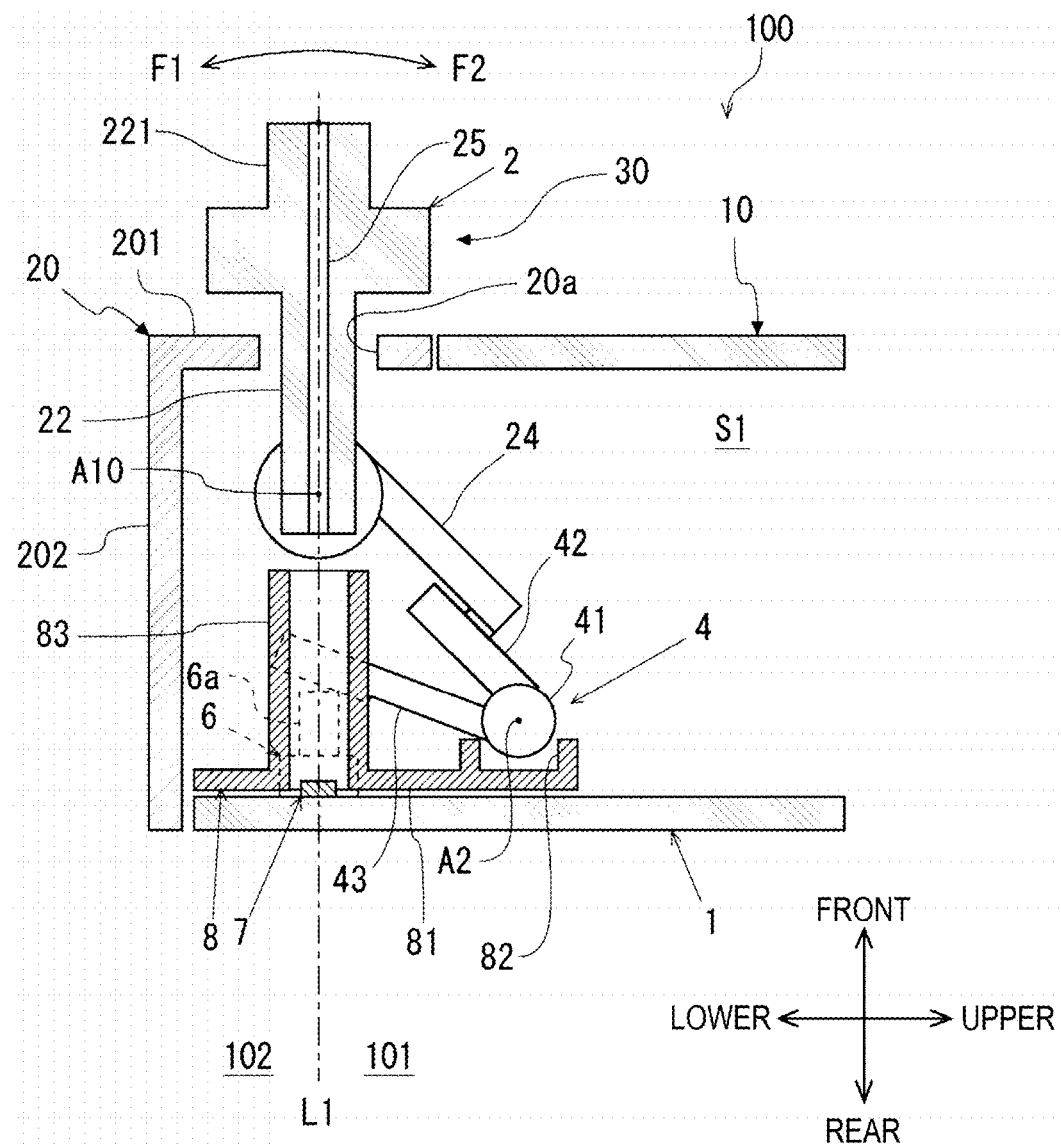
FIG. 4 is a cross-sectional view taken along a line B-B in FIG. 2.
Figure 5:
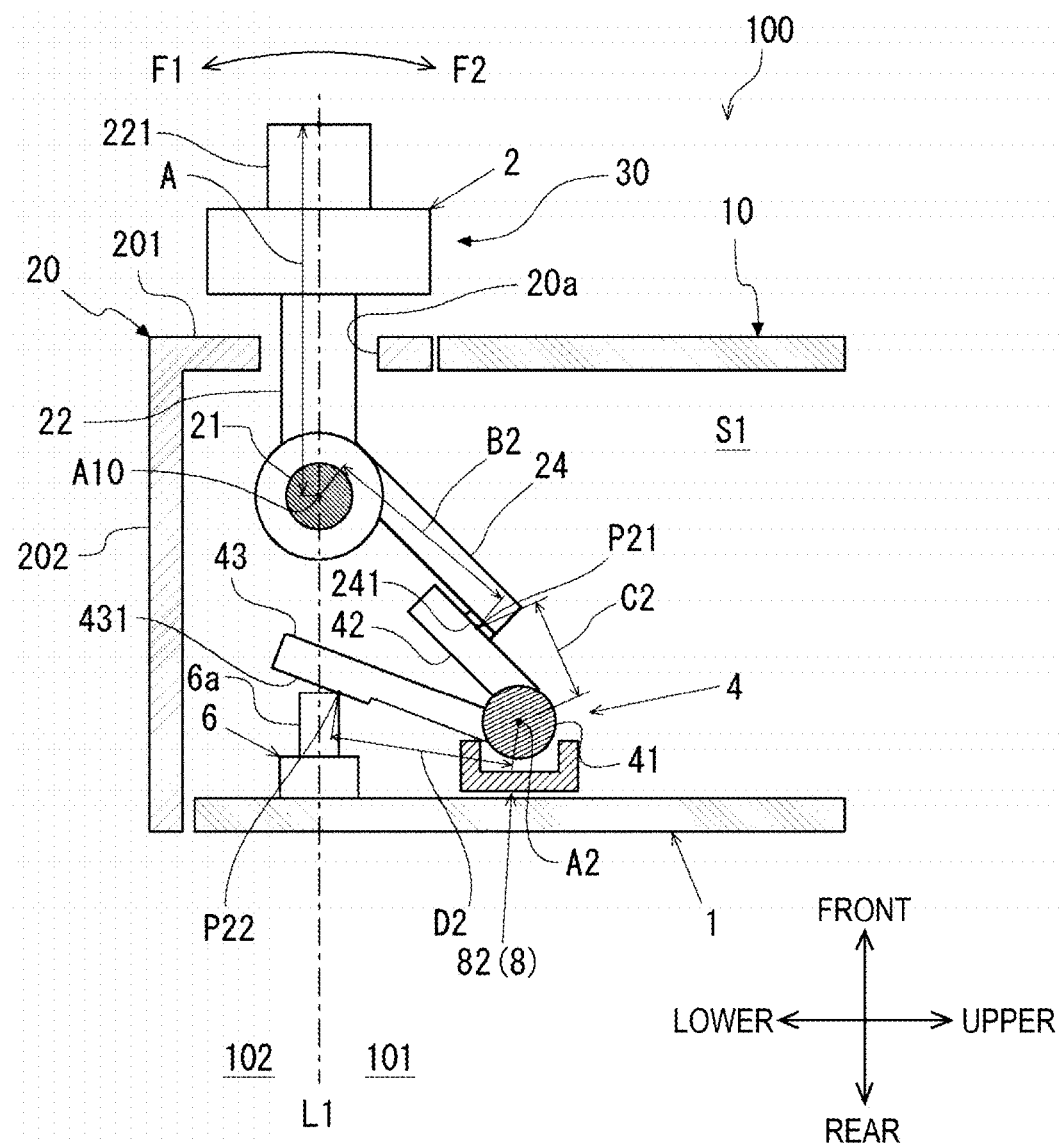
FIG. 5 is a cross-sectional view taken along a line C-C in FIG. 2.

FIG. 3 is a cross-sectional view taken along a line A-A in FIG. 2. FIG. 4 is a cross-sectional view taken along a line B-B in FIG. 2. FIG. 5 is a cross-sectional view taken along a line C-C in FIG. 2. FIGS. 3 to 5 show cross sections orthogonal to the left-right direction of the display device 100 and orthogonal to a rotation axis A10 extending in the left-right direction. Therefore, a positional relationship between components shown in FIGS. 3 to 5 corresponds to a positional relationship between the components when the display device 100 is projected onto a plane orthogonal to the rotation axis A10. In FIGS. 3 to 5, each configuration is simplified and illustrated. Hereinafter, with respect to a rotation direction centered on the rotation axis A10, a rotation direction when the operation lever indicated by reference numeral 2 is tilted downward is referred to as a first direction F1, and a rotation direction when the operation lever 2 is tilted upward, that is, a direction opposite to the first direction F1 is referred to as a second direction F2.

As shown in FIGS. 3 to 5, the lever switch 30 includes a circuit board 1, the operation lever 2, drive levers 3 and 4 (a first drive lever 3 and a second drive lever 4), push button switches 5 and 6 (a first switch 5 and a second switch 6), a light source 7, and a holder 8.

Figure 6:
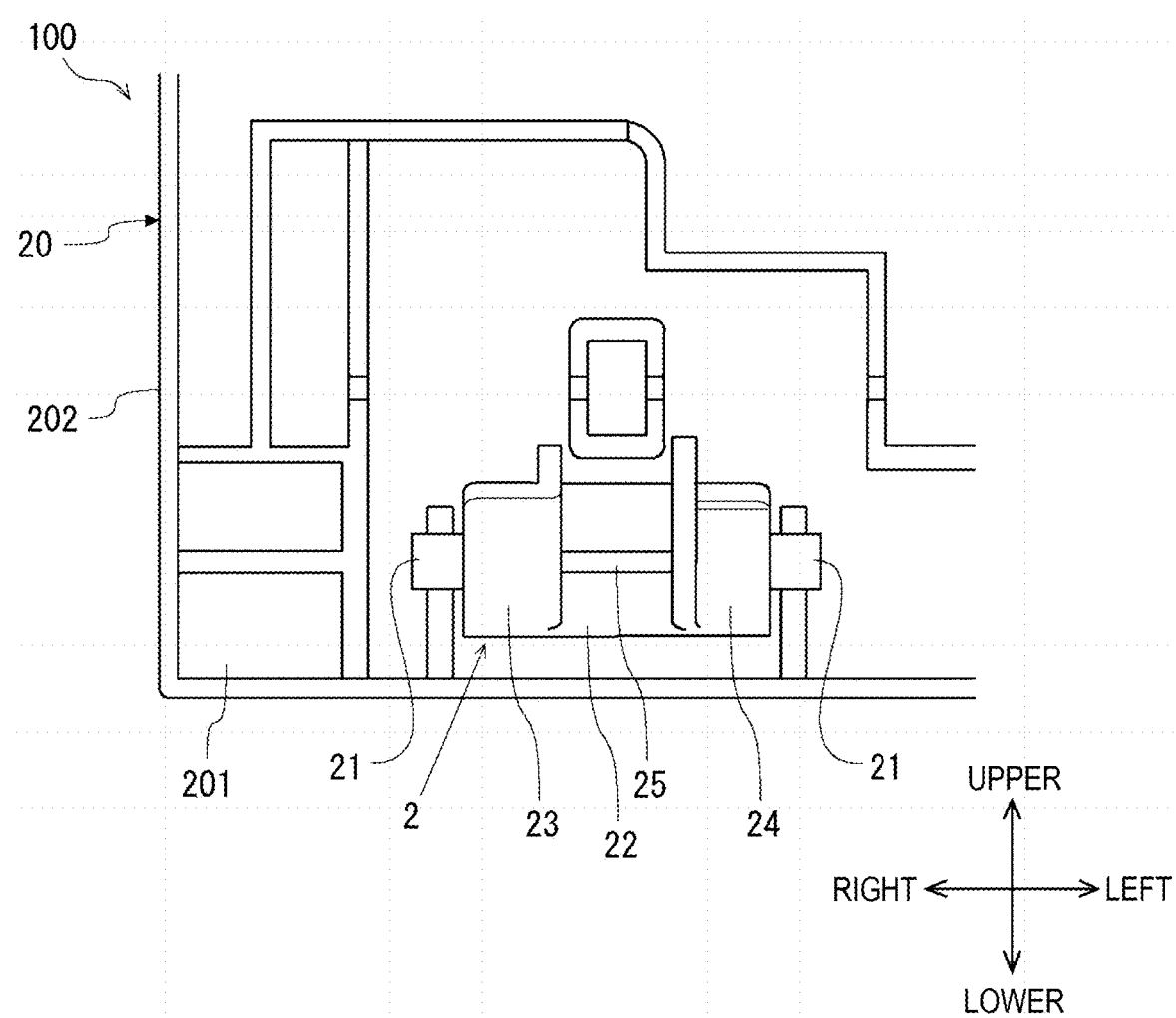
FIG. 6 is a rear view of a part of the display device according to the embodiment.
Figure 7:
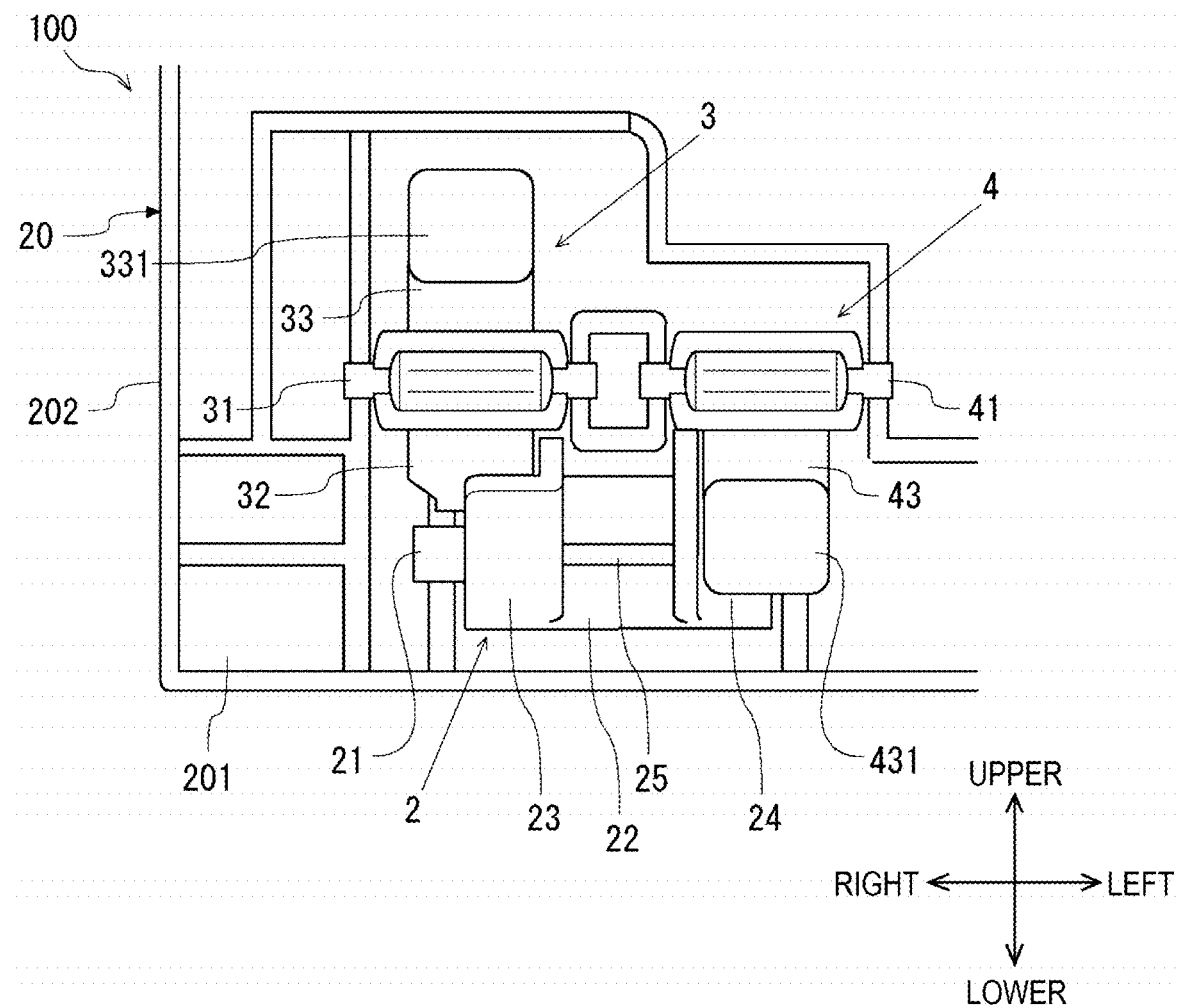
FIG. 7 is a rear view of the part of the display device according to the embodiment.
Figure 8:
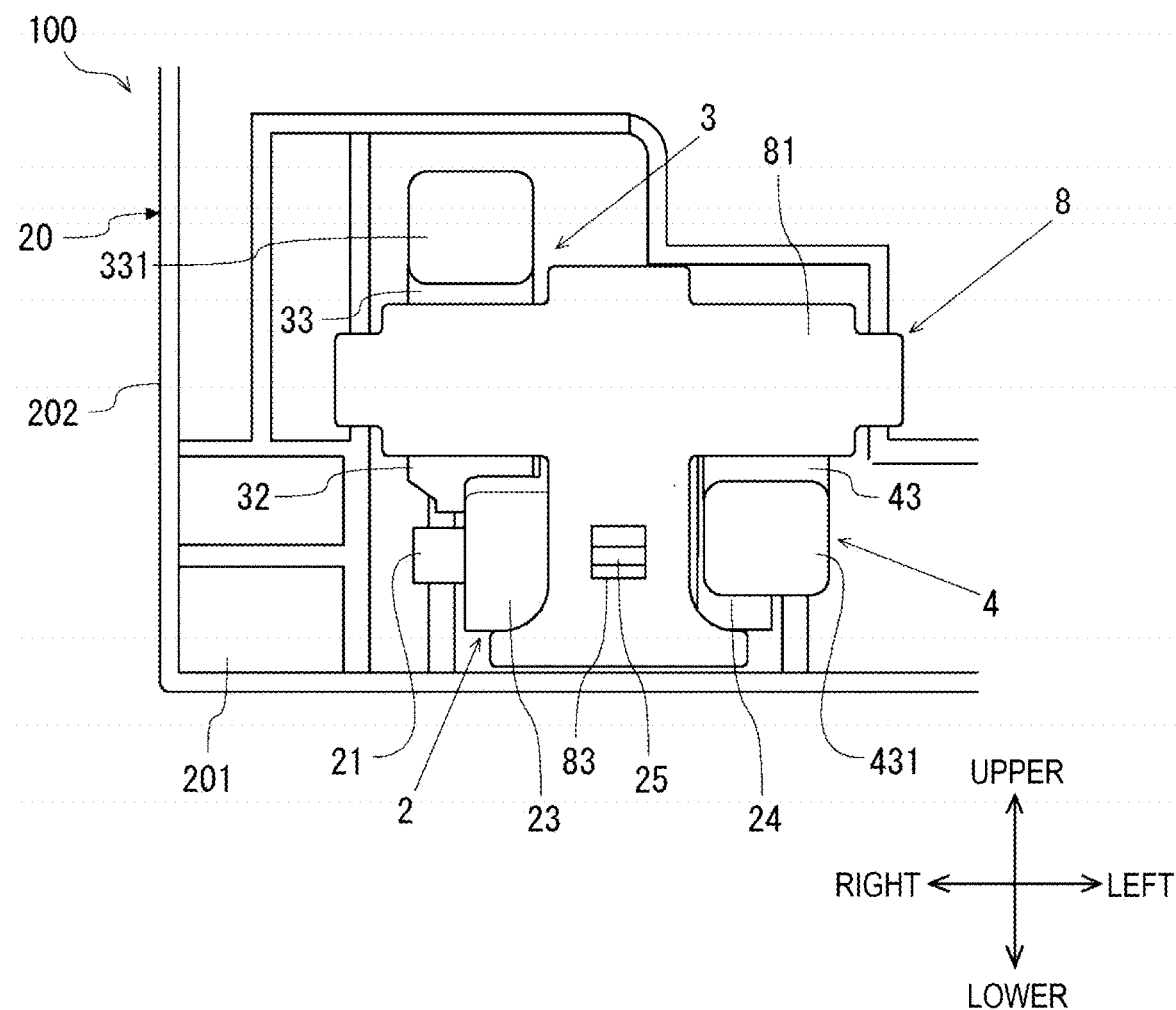
FIG. 8 is a rear view of the part of the display device according to the embodiment.

FIGS. 6 to 8 are rear views of a part of the display device 100 according to the present embodiment. FIGS. 6 to 8 show a lower right portion of the display device 100. FIG. 6 shows only the bezel 20 and the operation lever 2, FIG. 7 shows only the bezel 20, the operation lever 2, and the drive levers 3 and 4, and FIG. 8 shows only the bezel 20, the operation lever 2, the drive levers 3 and 4, and the holder 8.

Hereinafter, the structure of the lever switch 30 will be described in detail with reference to FIGS. 3 to 8.

(Circuit Board)

The circuit board 1 is an insulating board, and is disposed to face the display panel 10 and the front panel 201 of the bezel 20 on a rear side at an interval in the front-rear direction as shown in FIG. 3 and the like. A circuit pattern is formed on a front surface of the circuit board 1. The display panel 10, the bezel 20, and the circuit board 1 form a space S1 in which the operation lever 2, the drive levers 3 and 4, the push button switches 5 and 6, the light source 7, and the holder 8 are accommodated.

(Push Button Switch)

As shown in FIG. 3, the push button switches 5 and 6 are disposed on the circuit board 1 (the front surface of the circuit board 1). The push button switches 5 and 6 are disposed apart from each other in the upper-lower direction and the left-right direction, and the first switch 5 is disposed on an upper side and a right side of the second switch 6. Stems 5a and 6a are provided on top portions of the push button switches 5 and 6, respectively. In an initial state, the push button switches 5 and 6 are maintained in OFF state by biasing the stems 5a and 6a toward a top 10 portion side (front side) by a biasing force of a biasing member (not shown) provided inside. Examples of the biasing member include an elastic member such as a rubber spring. When the stems 5a and 6a are pushed toward the circuit board 1 (rear side) against the biasing force of the biasing member by an operation on the operation lever 2 to be described later, a movable contact point (not shown) provided inside comes into contact with the circuit pattern of the circuit board 1 to close the circuit. Accordingly, the push button switches 5 and 6 are turned on. When the pushing of the stems 5a and 6a is released, the stems 5a and 6a return to original positions due to the biasing force of the biasing member, and the contact between the movable contact point and the circuit pattern is released. Accordingly, the push button switches 5 and 6 are turned off. A known configuration may be adopted for the push button switches 5 and 6. The switch according to the present disclosure is not limited to the push button switch, and various types of switches may be used.

(Operation Lever)

The operation lever 2 is a member that swings (tilts) about the rotation axis A10 by an operation of a user. As shown in FIG. 3 and the like, the operation lever 2 includes a shaft portion 21, an operation arm 22, a first drive arm 23, a second drive arm 24, and a light guide portion 25, which are integrally formed. Therefore, the shaft portion 21, the operation arm 22, the first drive arm 23, the second drive arm 24, and the light guide portion 25 integrally rotate about the rotation axis A10.

The shaft portion 21 is a cylindrical portion extending in the left-right direction with the rotation axis A10 as a central axis. As shown in FIG. 6, the shaft portion 21 is provided to protrude from both the left and right sides of the operation lever 2, and is pivotally supported by the bezel 20 so that the operation lever 2 may swing around the rotation axis A10. As shown in FIG. 3 and the like, the shaft portion 21 is disposed at an interval from the circuit board 1 in the front-rear direction.

The operation arm 22 is a portion to be operated by a user. As shown in FIG. 3 and the like, the operation arm 22 extends in a radial direction centered on the rotation axis A10 and protrudes to the outside of a space S1 through the opening 20a. In the initial state, the operation arm 22 stands upright along a normal direction of the display panel 10 (in this example, the front-rear direction). A knob portion 221

(an example of an "operation portion") for a user to pinch the operation arm 22 with fingers for operation is provided at a tip end of the operation arm 22. That is, the knob portion 221 is a portion to which an operation load is applied by the user. In this description, the operation of the operation arm 22 by the user may be referred to as "operating the operation lever 2".

The first drive arm 23 drives the first drive lever 3. As shown in FIG. 3, the first drive arm 23 extends in the radial direction centered on the rotation axis A10 in a direction different from that of the operation arm 22. A first pressing portion 231 is provided at a side end portion on a first direction F1 side of the first drive arm 23. The first pressing portion 231 presses the first drive lever 3 by moving (swinging) in the first direction F1 centered on the rotation axis A10 as the operation lever 2 rotates when the operation lever 2 is operated in the first direction F1. The first pressing portion 231 according to the present embodiment is formed as a protruding portion protruding from the side end portion of the first drive arm 23, but is not limited to this, and may have any shape as long as the first pressing portion 231 can come into contact with and press the first drive lever 3.

The second drive arm 24 drives the second drive lever 4. As shown in FIG. 3 and the like, the second drive arm 24 extends in the radial direction centered on the rotation axis A10 and in a direction different from that of the operation arm 22 and the first drive arm 23. As shown in FIG. 5, a second pressing portion 241 is provided at a side end portion on a second direction F2 side of the second drive arm 24. The second pressing portion 241 presses the second drive lever 4 by moving (swinging) in the second direction F2 centered on the rotation axis A10 as the operation lever 2 rotates when the operation lever 2 is operated in the second direction F2. The second pressing portion 241 according to the present embodiment is formed as a protruding portion protruding from the side end portion of the second drive arm 24, but is not limited to this. The second pressing portion 241 may have any shape as long as it may come into contact with and press the second drive lever 4.

As shown in FIG. 6, the operation arm 22, the first drive arm 23, and the second drive arm 24 are provided at different positions in an axial direction (the left-right direction in this example). The first drive arm 23 is disposed on the right side, the second drive arm 24 is disposed on the left side, and the operation arm 22 is disposed between the first drive arm 23 and the second drive arm 24.

The light guide portion 25 is a portion that guides light emitted from the light source 7 to a tip end surface of the knob portion 221. As shown in FIG. 4, the light guide portion 25 according to the present embodiment is formed as a hollow portion extending from a base end of the operation arm 22 (base on the side opposite to the knob portion 221) to a tip end portion (the knob portion 221). Accordingly, the light incident on the operation lever 2 from a base end surface of the operation arm 22 is guided to the tip end surface of the knob portion 221 and emitted from the tip end surface. The light guide portion 25 is not limited to a hollow space, and may be formed to include an optical member capable of guiding light. The light guide portion according to the present disclosure may be anything that guides light to the front surface of the operation portion, and the light emitting surface is not limited to the tip end surface of the operation portion.

(First Drive Lever)

The first drive lever 3 is a member driven by the operation lever 2. When the operation lever 2 is operated in the first direction F1 centered on the rotation axis A10, the first drive lever 3 drives the first switch 5 by swinging in the second direction F2 centered on a first fulcrum A1, which is a rotation axis extending parallel to the rotation axis A10. As shown in FIG. 3, the first drive lever 3 includes a first shaft portion 31, a first pressure receiving arm 32, and a first pressing arm 33, which are integrally formed. Therefore, the first shaft portion 31, the first pressure receiving arm 32, and the first pressing arm 33 integrally rotate about the first fulcrum A1. The first drive lever 3 is disposed at a position corresponding to the first drive arm 23 of the operation lever 2 and the first switch 5 in the left-right direction.

The first shaft portion 31 is a cylindrical portion extending in the left-right direction with the first fulcrum A1 as a central axis. As shown in FIG. 7, the first shaft portion 31 protrudes to both left and right sides of the first drive lever 3, and is pivotally supported by the bezel 20 and the holder 8 so that the first drive lever 3 may swing around the rotation axis A10. As shown in FIG. 3, the first shaft portion 31 is disposed between the shaft portion 21 of the operation lever 2 and the first switch 5 in the upper-lower direction.

The first pressure receiving arm 32 is a portion to be pressed by the first pressing portion 231 of the operation lever 2. The first pressure receiving arm 32 extends in the radial direction centered on the first fulcrum A1. In the initial state, the first pressure receiving arm 32 is in contact with the first pressing portion 231 of the operation lever 2 from the second direction F2 side.

The first pressing arm 33 is a portion that drives the first switch 5. The first pressing arm 33 extends in the radial direction centered on the first fulcrum A1 in a direction different from the first pressure receiving arm 32. A first drive portion 331 is provided at a side end portion on the second direction F2 side of the first pressing arm 33. In the initial state, the first drive portion 331 is in contact with the stem 5a of the first switch 5. The first drive portion 331 presses the stem 5a by moving (swinging) in the second direction F2 centered on the first fulcrum A1 as the first drive lever 3 rotates when the first drive lever 3 is pressed by the first pressing portion 231, and pushes the stem 5a toward the circuit board 1. The first drive portion 331 according to the present embodiment is formed as a protruding portion protruding from the side end portion of the first pressing arm 33, but is not limited to this. The first drive portion 331 may have any shape as long as it may come into contact with and press the first switch 5.

(Second Drive Lever)

The second drive lever 4 is a member driven by the operation lever 2. When the operation lever 2 is operated in the second direction F2 centered on the rotation axis A10, the second drive lever 4 drives the second switch 6 by swinging in the first direction F1 centered on a second fulcrum A2, which is a rotation axis extending parallel to the rotation axis A10. As shown in FIG. 5, the second drive lever 4 includes a second shaft portion 41, a second pressure receiving arm 42, and a second pressing arm 43, which are integrally formed. Therefore, the second shaft portion 41, the second pressure receiving arm 42, and the second pressing arm 43 integrally rotate about the second fulcrum A2. The second drive lever 4 is disposed at a position corresponding to the second drive arm 24 of the operation lever 2 and the second switch 6 in the left-right direction.

The second shaft portion 41 is a cylindrical portion extending in the left-right direction with the second fulcrum A2 as a central axis. As shown in FIG. 7, the second shaft portion 41 protrudes to both left and right sides of the first drive lever 3, and is pivotally supported by the bezel 20 and the holder 8 so that the first drive lever 3 may swing around the rotation axis A10. As shown in FIG. 5, the second shaft portion 41 is disposed between the shaft portion 21 of the operation lever 2 and the second switch 6 in the upper-lower direction.

The second pressure receiving arm 42 is a portion to be pressed by the second pressing portion 241 of the operation lever 2. The second pressure receiving arm 42 extends in the radial direction centered on the second fulcrum A2. In the initial state, the second pressure receiving arm 42 is in contact with the second pressing portion 241 of the operation lever 2 from the first direction F1 side.

The second pressing arm 43 is a portion that drives the second switch 6. The second pressing arm 43 extends in the radial direction centered on the second fulcrum A2 in a direction different from the second pressure receiving arm 42. A second drive portion 431 is provided at a side end portion on the first direction F1 side of the second pressing arm 43. In the initial state, the second drive portion 431 is in contact with the stem 6a of the second switch 6. The second drive portion 431 presses the stem 6a by moving (swinging) in the first direction F1 centered on the second fulcrum A2 as the second drive lever 4 rotates when the second drive lever 4 is pressed by the second pressing portion 241, and pushes the stem 6a toward the circuit board 1. The second drive portion 431 according to the present embodiment is formed as a protruding portion protruding from the side end portion of the second pressing arm 43, but is not limited to this, and may have any shape as long as the second drive portion 431 may come into contact with and press the second switch 6.

(Light Source)

The light source 7 is a light emitting diode (LED) light source having a light emitting surface. As shown in FIG. 4, the light source 7 is disposed on the circuit board 1 such that the light emitting surface faces forward. The light source 7 is disposed at a position facing the light guide portion 25 in the front-rear direction such that the light guide portion 25 of the operation lever 2 is positioned on an optical axis of the light source 7. The light source according to the present disclosure is not limited to the LED, and may be implemented by other types of light emitting elements. The light source may be, for example, an organic electro luminescence (EL).

(Holder)

The holder 8 is a member that holds the first drive lever 3 and the second drive lever 4. As shown in FIG. 3 and the like, the holder 8 is arranged between the drive levers 3 and 4 and the circuit board 1 in the front-rear direction, and supports the drive levers 3 and 4 from the rear side by being fixed to the bezel 20. The holder 8 includes a main body portion 81, a shaft support portion 82, and a tubular portion 83. The main body portion 81 is formed in a plate shape, and is disposed in a posture orthogonal to the front-rear direction. The shaft support portion 82 is provided on a front surface of the main body portion 81 and rotatably supports the first shaft portion 31 of the first drive lever 3 and the second shaft portion 41 of the second drive lever. The tubular portion 83 is formed in a tubular shape that penetrates the main body portion 81 and extends in the front-rear direction. As shown in FIG. 4, the tubular portion 83 is disposed to surround the light source 7. The light emitted from the light source 7 passes through the tubular portion 83, enters the light guide portion 25 of the operation lever 2, and is emitted from the tip end surface of the knob portion 221.

(Operation)

Next, operations of the lever switch 30 according to the present embodiment will be described. In the initial state shown in FIGS. 3 to 5, the push button switches 5 and 6 are maintained in the OFF state by the biasing force of the biasing member. As shown in FIGS. 3 and 5, in the initial state, the first pressing portion 231 of the operation lever 2 is in contact with the first pressure receiving arm 32 of the first drive lever 3, and the first drive portion 331 of the first drive lever 3 is in contact with the first switch 5. In the initial state, the second pressing portion 241 of the operation lever 2 is in contact with the second pressure receiving arm 42 of the second drive lever 4, and the second drive portion 431 of the second drive lever 4 is in contact with the second switch 6. Therefore, in the initial state, the operation lever 2 is supported by a reaction force of the push button switches 5 and 6 (the biasing force of the biasing member) via the drive levers 3 and 4, and the operation arm 22 is maintained in an upright posture.

First, an ON operation of the first switch 5 will be described with reference to FIG. 3. An operation load is applied to the knob portion 221 of the operation arm 22 by the user so that the operation arm 22 is tilted downward from the initial state. The operation lever 2 is operated in the first direction F1 centered on the rotation axis A10 against the reaction force of the first switch 5. Then, the first pressing portion 231 of the first drive arm 23 moves in the first direction F1, so that the first pressure receiving arm 32 of the first drive lever 3 is pressed. Accordingly, the first drive lever 3 swings in the second direction F2 centered on the first fulcrum A1. The first drive portion 331 of the first pressing arm 33 moves in the second direction F2 centered on the first fulcrum A1 as the first drive lever 3 rotates, so that the stem 5a of the first switch 5 is pushed toward the circuit board 1, and the first switch 5 is driven. Thus, the first switch 5 is turned on.

Next, an ON operation of the second switch 6 will be described with reference to FIG. 5. An operation load is applied to the knob portion 221 of the operation arm 22 by the user so that the operation arm 22 is tilted upward from the initial state. The operation lever 2 is operated in the second direction F2 centered on the rotation axis A10 against the reaction force of the second switch 6. Then, the second pressing portion 241 of the second drive arm 24 moves in the second direction F2, so that the second pressure receiving arm 42 of the second drive lever 4 is pressed. Accordingly, the second drive lever 4 swings in the first direction F1 centered on the second fulcrum A2. The second drive portion 431 of the second pressing arm 43 moves in the first direction F1 centered on the second fulcrum A2 as the second drive lever 4 rotates, so that the stem 6a of the second switch 6 is pushed toward the circuit board 1, and the second switch 6 is driven. Thus, the second switch 6 is turned on.

Next, an OFF operation of the push button switches 5 and 6 will be described. When the operation load on the knob portion 221 is removed from a state where the first switch 5 or the second switch 6 is turned on, the drive levers 3 and 4 and the operation lever 2 are rotated due to the reaction force of the push button switches 5 and 6, and the operation lever 2 returns to the upright posture. As a result, the push button switches 5 and 6 are turned off, and the lever switch 30 is in the initial state.

As described above, the lever switch 30 may be operated. An in-vehicle device including the display device 100 may control the display of the display panel 10 based on a control signal output from the push button switches 5 and 6 that are turned on. For example, the in-vehicle device may move an image or a cursor displayed on the display panel 10 in accordance with a tilting direction of the operation lever 2.

(Positional Relationship)

Next, a positional relationship of each component of the display device 100 according to the present embodiment will be described. Here, a virtual straight line passing through the knob portion 221 and the rotation axis A10 when the lever switch 30 is projected onto a plane orthogonal to the rotation axis A10 of the operation lever 2 is indicated by reference numeral L1 in FIGS. 3 to 5. The virtual straight line L1 according to the present embodiment extends parallel to the front-rear direction. Here, a plane orthogonal to the rotation axis A10 may be divided into two regions with the virtual straight line L1 as a boundary. In the plane orthogonal to the rotation axis A10, a region above the virtual straight line L1 is defined as a first region 101, and a region below the virtual straight line L1 is defined as a second region 102.

As shown in FIG. 3, the first fulcrum A1 of the first drive lever 3 is located in the first region 101. That is, the first fulcrum A1 is disposed above the virtual straight line L1 and separated from the virtual straight line L1. As shown in FIG. 5, the second fulcrum A2 of the second drive lever 4 is also located in the first region 101. That is, the second fulcrum A2 is disposed above the virtual straight line L1 and separated from the virtual straight line L1. Accordingly, when projected onto a plane orthogonal to the rotation axis A10, the first fulcrum A1 and the second fulcrum A2 are disposed on the same side (upper side in this example) with respect to the virtual straight line L1 and separated from the virtual straight line L1. According to this, one of the push button switches 5 and 6 (in this example, the second switch 6) may be disposed in the vicinity of the virtual straight line L1. Further, as compared with a case where the first fulcrum A1 and the second fulcrum A2 are disposed on opposite sides of the virtual straight line L1, it is possible to reduce a space required for disposing the drive levers 3 and 4 in a direction orthogonal to the virtual straight line L1 (in this example, the upper-lower direction) within the above-mentioned plane. Therefore, according to the present embodiment, space for the lever switch 30 may be saved. As in the present embodiment, the first fulcrum A1 and the second fulcrum A2 are disposed on an inner side (the display panel 10 side) of the bezel 20 with respect to the virtual straight line L1, so that the lever switch 30 can be disposed with a margin even with respect to the bezel 20 with a narrow frame having a narrow width and a limited arrangement space. In the present embodiment, the first fulcrum A1 and the second fulcrum A2 are disposed coaxially, and the present disclosure is not limited thereto.

Here, as shown in FIG. 3, it is assumed that a contact point between the first pressing portion 231 of the operation lever 2 and the first pressure receiving arm 32 of the first drive lever 3 in the initial state is defined as a contact point P11, and a contact point between the first drive portion 331 of the first drive lever 3 and the first switch 5 in the initial state is defined as a contact point P12. At this time, in a direction orthogonal to an extending direction of the virtual straight line L1 (upper-lower direction in this example), the contact point P11 and the contact point P12 are disposed on opposite sides with respect to the first fulcrum A1. As shown in FIG. 5, it is assumed that a contact point between the second pressing portion 241 of the operation lever 2 and the second pressure receiving arm 42 of the second drive lever 4 in the initial state is defined as a contact point P21, and a contact point between the second drive portion 431 of the second drive lever 4 and the second switch 6 in the initial state is defined as a contact point P22. At this time, in the direction orthogonal to the extending direction of the virtual straight line L1, the contact point P21 and the contact point P22 are disposed on the same side (lower side in this example) with respect to the second fulcrum A2. As described above, in the lever switch 30 according to the present embodiment, the first drive lever 3 and the second drive lever 4 have different positions of contact points with the operation lever 2 and the push button switches 5 and 6. Accordingly, the push button switches 5 and 6 may be driven while the first fulcrum A1 and the second fulcrum A2 are disposed to be separated from each other on the same side with respect to the virtual straight line L1.

As shown in FIG. 1, when the display device 100 is projected onto a plane orthogonal to the normal direction of the display panel 10, the operation lever 2 is disposed at a position overlapping the bezel 20, and the first switch 5 of the push button switches 5 and 6 is disposed at a position overlapping the display panel 10. The first switch 5 is disposed at a position overlapping the display panel 10, so that it is not necessary to secure a space in the bezel 20 for the first switch 5, and thus the frame of the bezel 20 can be narrowed.

(Lever Ratio)

Hereinafter, a lever ratio of the lever switch 30 will be described. The "lever ratio" is also referred to as a leverage ratio, and is generally expressed as a ratio of a distance between a fulcrum and a point of effort to a distance between the fulcrum and a point of action. By changing the lever ratio, a load required for a lever operation may be adjusted. That is, it is possible to adjust the operation feeling (operation force) such as hardness or softness of the lever operation. In the present embodiment, by setting the arrangement and dimensions of each lever and each switch such that the lever ratio (total lever ratio) of the operation lever 2 to the first switch 5 and the lever ratio (total lever ratio) of the operation lever 2 to the second switch 6 are equal, it is possible to provide the same operation feeling in a driving operation of the first switch 5 and a driving operation of the second switch 6. Hereinafter, details will be described. The expression "lever ratios are the same" indicates that the lever ratios do not need to be exactly the same as long as there is not a noticeable difference in the operation feeling, and includes a case where the lever ratios are substantially the same. The expression "lever ratios are substantially the same" indicates that, for example, when one lever ratio and the other lever ratio are compared, a difference therebetween is 10% or less, and includes a case where the lever ratios are exactly the same (the difference is 0%).

As shown in FIG. 3, it is assumed that a distance from the tip end of the knob portion 221 to which an operation load is applied to the rotation axis A10 is denoted by A, a distance from the rotation axis A10 to the contact point P11 between the first pressing portion 231 and the first drive lever 3 is denoted by B1, a distance from the contact point P11 to the first fulcrum A1 is denoted by C1, and a distance from the first fulcrum A1 to the contact point P12 between the first drive portion 331 and the first switch 5 is denoted by D1. As shown in FIG. 5, it is assumed that a distance from the rotation axis A10 to the contact point P21 between the second pressing portion 241 and the second drive lever 4 is denoted by B2, a distance from the contact point P21 to the second fulcrum A2 is denoted by C2, and a distance from the second fulcrum A2 to the contact point P22 between the second drive portion 431 and the second switch 6 is denoted by D2.

Further, it is assumed that the lever ratio of the operation lever 2 to the first drive lever 3 is denoted by X1, the lever ratio of the first drive lever 3 to the first switch 5 is denoted by Y1, the lever ratio of the operation lever 2 to the second drive lever 4 is denoted by X2, and the lever ratio of the second drive lever 4 to the second switch 6 is denoted by Y2. At this time, each lever ratio is obtained by the following relational equations.

$$X1 = A/B1 \quad \text{(Equation (1))}$$
$$Y1 = C1/D1 \quad \text{(Equation (2))}$$
$$X2 = A/B2 \quad \text{(Equation (3))}$$
$$Y2 = C2/D2 \quad \text{(Equation (4))}$$

When the lever ratio of the operation lever 2 to the first switch 5 is a total lever ratio Z1, the total lever ratio Z1 is the product of the lever ratio X1 of the operation lever 2 to the first drive lever 3 and the lever ratio Y1 of the first drive lever 3 to the first switch 5. That is, Z1 is obtained by the following relational equation.

$$Z1 = X1 \times Y1 \quad \text{(Equation (5))}$$

Similarly, when the lever ratio of the operation lever 2 to the second switch 6 is a total lever ratio Z2, Z2 is obtained by the following relational equation.

$$Z2 = X2 \times Y2 \quad \text{(Equation (6))}$$

As described above, in the present embodiment, the arrangement and dimensions of each lever and each switch are set so that the total lever ratio Z1 of the operation lever 2 with respect to the first switch 5 and the total lever ratio Z2 of the operation lever 2 with respect to the second switch 6 are equal to each other. Specifically, in the present embodiment, (X1×Y1) and (X2×Y2) are equivalent, and in detail, ((A/B1)× (C1/D1)) and ((A/B2)× (C2/D2)) are equivalent. Accordingly, the same operation feeling may be provided for the driving operation of the first switch 5 and the driving operation of the second switch 6.

The magnitude of the lever ratio is not particularly limited, and from the viewpoint of providing a suitable operation feeling, the total lever ratio Z1 and the total lever ratio Z2 are preferably equal to 1. This makes it possible to obtain an operation feeling equivalent to that obtained when the switch is directly operated (pressed) without using the lever. The expression "lever ratio is equal to 1" indicates that the lever ratio does not need to be exactly the same as long as a noticeable difference does not occur with respect to the operation feeling obtained when the switch is directly operated, and includes a case where the lever ratio is substantially equal to 1. The expression "lever ratio is substantially equal to 1" indicates that, for example, the lever ratio is 0.9 or more and 1.1 or less, and includes a case where the lever ratio is exactly equal to 1. For example, by making (C1/D1) and 1/(A/B1) equivalent, the total lever ratio Z1 may be made equal to 1. Similarly, for example, by making (C2/D2) and (1/(A/B2)) equivalent, the total lever ratio Z2 may be made equivalent to 1. Further, from the viewpoint of space saving (thinning) of the lever switch 30 in the bezel 20 (space S1) in the extending direction (front-rear direction) of the virtual straight line L1, it is preferable that A>B1 and A>B2.

As described above, in the lever switch 30 according to the present embodiment, when projected onto the plane orthogonal to the rotation axis A10 of the operation lever 2, the first fulcrum A1 and the second fulcrum A2 are disposed on the same side with respect to the virtual straight line L1 passing through the knob portion 221 and the rotation axis A10 and separated from the virtual straight line L1. Accordingly, space saving for the lever switch 30 may be achieved.

Further, in the lever switch 30 according to the present embodiment, the total lever ratio Z1 of the operation lever 2 with respect to the first switch 5 and the total lever ratio Z2 of the operation lever 2 with respect to the second switch 6 are made equal to each other, so that the same operation feeling may be provided in the driving operation of the first switch 5 and the driving operation of the second switch 6. Further, by making the total lever ratio Z1 and the total lever ratio Z2 equal to 1, it is possible to provide a preferable operation feeling.

The lever switch 30 according to the present embodiment further includes the holder 8 that holds the drive levers 3 and 4. The holder 8 includes the tubular portion 83 formed to surround the light source 7. The operation lever 2 includes the light guide portion 25 that guides the light emitted from the light source 7 and passing through the tubular portion 83 to a front surface of the knob portion 221. Accordingly, the visibility and the aesthetic appearance of the operation lever 2 may be improved. In addition, by surrounding the light source 7 with the tubular portion 83, it is possible to prevent the light of the light source 7 from leaking to the outside of the display device 100 from a place other than the light guide portion 25.

Further, in the display device 100 including the lever switch 30 according to the present embodiment, when projected onto a plane orthogonal to the normal direction of the display panel 10, the operation lever 2 is disposed at a position overlapping the bezel 20, and the first switch 5 is disposed at a position overlapping the display panel 10. Thus, the bezel 20 may be narrowed. From the viewpoint of narrowing the bezel 20, at least one of the first switch 5 and the second switch 6 may be disposed at a position overlapping the display panel 10.

(Others)

Although the present disclosure has been described above with reference to the embodiment, the present disclosure is not limited to the above-described embodiment.

What is claimed is:

1. A lever switch comprising:
    an operation lever configured to swing around a rotation axis and including an operation portion to which an operation load is to be applied;
    a first drive lever driven by the operation lever and configured to rotate around a first fulcrum to drive a first switch in response to the operation lever being operated to swing around the rotation axis in a first direction; and
    a second drive lever driven by the operation lever and configured to rotate around a second fulcrum to drive a second switch in response to the operation lever being operated to swing around the rotation axis in a second direction opposite to the first direction, wherein
    when projected onto a plane orthogonal to the rotation axis, the first fulcrum and the second fulcrum (i) are disposed on a same side of a virtual straight line passing through the operation portion and the rotation axis, and (ii) are separated from the virtual straight line.

2. The lever switch according to claim 1, wherein
a lever ratio of the operation lever to the first switch is equal to a lever ratio of the operation lever to the second switch.

3. The lever switch according to claim 1, wherein
(X1×Y1) is equal to (X2×Y2), in which X1 is a lever ratio of the operation lever to the first drive lever, Y1 is a lever ratio of the first drive lever to the first switch, X2 is a lever ratio of the operation lever to the second drive lever, and Y2 is a lever ratio of the second drive lever to the second switch.

4. The lever switch according to claim 1, wherein
the operation lever includes a first pressing portion configured to press the first drive lever by moving in the first direction about the rotation axis in response to the operation lever being operated in the first direction, and a second pressing portion configured to press the second drive lever by moving in the second direction about the rotation axis in response to the operation lever being operated in the second direction,
the first drive lever includes a first drive portion configured to press the first switch by moving in a circumferential direction about the first fulcrum in response to the first drive lever being pressed by the first pressing portion,
the second drive lever includes a second drive portion configured to press the second switch by moving in the circumferential direction about the second fulcrum in response to the second drive lever being pressed by the second pressing portion, and
(A/B1)×(C1/D1) is equal to (A/B2)×(C2/D2), in which A is a distance from a tip end of the operation portion to the rotation axis, B1 is a distance from the rotation axis to a contact point between the first pressing portion and the first drive lever, C1 is a distance from the contact point between the first pressing portion and the first drive lever to the first fulcrum, D1 is a distance from the first fulcrum to a contact point between the first drive portion and the first switch, B2 is a distance from the rotation axis to a contact point between the second pressing portion and the second drive lever, C2 is a distance from the contact point between the second pressing portion and the second drive lever to the second fulcrum, and D2 is a distance from the second fulcrum to a contact point between the second drive portion and the second switch.

5. The lever switch according to claim 2, wherein
the lever ratio of the operation lever to the first switch and the lever ratio of the operation lever to the second switch are equal to 1.

6. The lever switch according to claim 1, further comprising
a holder configured to hold the first drive lever and the second drive lever, the holder having a tubular portion formed to surround a light source, wherein
the operation lever includes a light guide portion configured to guide light emitted from the light source and passing through the tubular portion to a front surface of the operation portion.

7. The lever switch according to claim 1, wherein
the lever switch is provided in a display device including a display panel and a bezel surrounding the display panel, and
when projected onto a plane orthogonal to a normal direction of the display panel, the operation lever is disposed at a position overlapping the bezel, and at least one of the first switch and the second switch is disposed at a position overlapping the display panel.

8. A display device comprising:
a display panel;
a bezel surrounding the display panel; and
the lever switch according to claim 1.

9. An in-vehicle device comprising:
the display device according to claim 8.

10. The lever switch according to claim 1, wherein
the operation lever extends in a first direction,
the first drive lever extends in a second direction different from the first direction in which the operation lever extends, and
the second drive lever extends in a third direction different from the first direction in which the operation lever extends.

11. The lever switch according to claim 10, wherein
the third direction in which the second drive lever extends is different from the second direction in which the first drive lever extends.

12. The lever switch according to claim 1, wherein
a first axis defined by the first fulcrum and around which the first drive lever rotates and a second axis defined by the second fulcrum and around which the second drive lever rotates are separated from the rotation axis of the operation lever.

13. The lever switch according to claim 12, wherein
the first axis and the second axis are co-linear.

14. The lever switch according to claim 12, further comprising
the first switch and the second switch, wherein
the first switch is a first electrical switch that moves between ON and OFF positions to close and open a first circuit, and
the second switch is a second electrical switch that moves between ON and OFF positions to close and open a second circuit.

* * * * *